United States Patent [19]

Messina

[11] Patent Number: 5,584,283
[45] Date of Patent: Dec. 17, 1996

[54] COOKING FUEL CONTAINER AND BURNER HAVING TOROIDAL SHAPED BURN AREA AND FLAME

[75] Inventor: Neale A. Messina, Ewing, N.J.

[73] Assignee: Colgate-Palmolive Company, New York, N.Y.

[21] Appl. No.: 152,762

[22] Filed: Nov. 15, 1993

[51] Int. Cl.$^6$ ...................................................... F24C 5/00
[52] U.S. Cl. ................... 126/43; 126/45; 431/320
[58] Field of Search ................. 126/43, 44, 45, 126/95, 96, 512, 92 R, 25 C, 39 R, 263, 262; 431/320, 323, 298, 324

[56] References Cited

U.S. PATENT DOCUMENTS

| | | | |
|---|---|---|---|
| 1,226,625 | 5/1917 | Ball | 126/43 |
| 1,267,475 | 5/1918 | Strobl | 126/43 |
| 1,345,419 | 7/1920 | Valentine | 126/43 |
| 1,446,353 | 2/1923 | Slocum | 126/43 |
| 1,609,958 | 12/1926 | Perrault | 126/206 |
| 2,800,174 | 7/1957 | Konstandt | 158/88 |
| 3,371,659 | 3/1968 | Paspalas | 126/43 |
| 3,547,100 | 12/1970 | Usui | 126/206 |
| 3,888,620 | 6/1975 | Devon | 431/291 |
| 4,170,981 | 10/1979 | Hakata et al. | 126/43 |
| 4,621,609 | 11/1986 | Kitchen | 126/56 |
| 4,896,653 | 1/1990 | Eke et al. | 126/45 |
| 5,000,162 | 3/1991 | Shimek et al. | 126/92 R |
| 5,143,046 | 9/1992 | Koziol | 126/43 |

FOREIGN PATENT DOCUMENTS

| | | | |
|---|---|---|---|
| 0540133A2 | 5/1993 | European Pat. Off. . | |
| 578565 | 7/1924 | France | 126/43 |
| 752379 | 9/1933 | France | 126/43 |
| 678253 | 4/1938 | Germany | 126/43 |
| 2648601 | 5/1978 | Germany . | |
| 197805 | 5/1978 | Germany | 126/43 |
| 57497 | 10/1911 | Switzerland | 126/43 |
| 71855 | 9/1915 | Switzerland | 126/43 |
| 388335 | 2/1933 | United Kingdom . | |
| 2158698 | 11/1985 | United Kingdom . | |

Primary Examiner—James C. Yeung
Attorney, Agent, or Firm—James M. Serafino; Michael J. McGreal

[57] ABSTRACT

A cooking fuel device includes a fuel container and a cover attached to the top of the container. The cover includes a central toroidal shaped aperture positioned over the top of the container to define a toroidal burn area for a fuel in the container. An optional wick positioned below the cover is formed from a piled fabric includes a burn portion and a fuel feed portion extending to the fuel in the container.

13 Claims, 4 Drawing Sheets

COOKING FUEL CONTAINER AND BURNER HAVING TOROIDAL SHAPED BURN AREA AND FLAME

FIELD OF THE INVENTION

The present invention is directed to a cooking fuel container and burner capable of providing a sufficient amount of heat for several hours for heating and cooking food. More particularly, this invention relates to a cooking fuel container and burner that is capable of maintaining a high temperature for several hours by forming a flame front having a substantially toroidal shape.

BACKGROUND OF THE INVENTION

There is a continuing need for cooking and food warming fuel containers and burners which are able to produce an effective temperature level for an extended period of time. These cooking fuel containers and burners often use a fuel that is classified as non-flammable for a greater level of safety during usage and transportation. It is preferred that the cooking fuel container and burner produce a temperature in an oven, chafing dish or buffet server of at least about 160° F., and preferably at least about 180° F., throughout the majority of its full burn time. The burn time for a cooking fuel container and burner should be at least about three hours, and preferably at least about four hours. A cooking fuel container and burner which will produce a cooking temperature of at least about 180° F. or greater and have a burn time of at least four hours will provide sufficient heat to chafing dishes and buffet servers for a sufficient period of time so that the cooking fuel containers do not have to be changed during a serving session.

The previous cooking fuel containers are able to provide a cooking temperature of about 180°–190° F. for about three hours. These devices are relatively efficient in burning and provide sufficient cooking temperature throughout a substantial portion of the life of the device. The burn temperature of these devices is fixed by the design of the burner. There are occasions when the user desires a higher temperature than that provided by the previous fuel containers.

It is known that the burn temperature of a fuel is dependent in part by the amount of air being fed to the flame. Numerous devices in the past have included air inlets to the fuel burn area to optimize combustion. Devices of this type typically include a fuel container for supporting a solid or liquid fuel and cover having a central opening for the flame to exit the container. One or more openings are also provided in the cover spaced outwardly from the central opening to feed air downwardly into the container. These air inlets generally feed air to a single burn front. Examples of this type of fuel burning device include U.S. Pat. No. 1,446,353 to Slocum; U.S. Pat. No. 1,919,622 to Sevcik; U.S. Pat. No. 1,226,625 to Ball; U.S. Pat. No. 1,267,475 to Stroble; British Pat. No. 168,871; British Pat. No. 388,335; German Pat. Publication No. 678,253; German Pat. Publication 2 618 394; and German Pat. Publication No. 2 804 589.

Another form of device for feeding air to a flame in a fuel container is disclosed in U.S. Pat. No. 3,371,659 to Paspalas. This device includes a conventional fuel container having an open top. A removable cover having upstanding sidewalls extending from the wall of the container for supporting a cooking vessel. The wall of the cover includes a plurality of openings to allow air to enter the cover. U.S. Pat. No. 4,188,938 to Hasenfratz discloses a similar burner device having a plurality of air inlet openings to feed air to a central flame outlet.

A further form of burner includes a cover having a plurality of openings to expose a wick positioned below the cover. The openings are spaced apart a distance to define distinct burn areas. Examples of this type of device are disclosed in Swiss Pat. No. 57497 and German Pat. Publication No. 2 648 601.

Another form of burner device is disclosed in French Pat. No. 578565. This device includes an adjustable wick contained in a cage-like structure. In the raised position, the sides of the wick and the top surface are exposed to support combustion of the fuel.

Various other cooking fuel containers and burners have been disclosed in the prior art which are designed to produce efficient burning of the fuel. One such cooking fuel container and burner is described in U.S. Pat. No. 4,604,053. This food warming cartridge consists of a cylindrical container with a top cover closing the opening of the container. In a central portion of this container and top cover there is a square or rectangular region to expose a flat wick, the two ends of which extend downward into the fuel which is contained in the food warming cartridge. The fuel is fed up the wick to the burning surface where it is burned to provide the desired heat. This design does not provide for insulating the fuel containing region of the cartridge from the heat that is produced from the burning of the fuel. Thus, some of the heat from the burning fuel will be transmitted through the cover to the fuel. The heat produces pressure within the container forcing the fuel up the wick resulting in an uneven burn temperature and an inconsistent burn time.

U.S. Pat. No. 4,611,986 discloses a disposable liquid fuel burner. This liquid fuel burner is illustrative of a typical center wick burner where the wick extends downwardly through the top cover of a cylindrical fuel container. This wick extends a distance above the top cover to define a burn surface elevated a distance above the top cover above the burner. Since this device comprises a single central wick, it tends to produce a small diameter flame and thus a localized heating. It is preferred that the fuel burn surface be as large an area as possible to provide for a more even heating of buffet trays and chafing dishes. Also, typically fuel burners of this type do not have a substantially constant burn temperature throughout the full burn time.

U.S. Pat. No. 4,850,858 discloses a liquid fuel burner which provides an enlarged burn surface area. This liquid fuel burner consists of a cylindrical container which has a top closure. Within this top closure is an opening to provide for the enlarged burning surface. Within the container portion there is a wick which passes upwardly from the fuel region up into a wick region. This wick is of a single strand which passes upwardly through the center of a wick supporting table and overlays this wick supporting table. Overlaying the wick is a non-combustible fiber bat and a plastic foam bat as an ignitor. The plastic foam bat is ignited and burns away and in most instances will effectively light the fuel in the fiber bat which then provides the burning surface for the liquid fuel.

U.S. Pat. No. 4,896,653 discloses a cooking fuel can and burner having a central recessed area and peripheral air vents. A drawback of this type of a cooking fuel product is the lack of a constant heat profile. This type of cooking fuel container will produce a lower heat level upon ignition followed by an increasing level of heat production during the burning of the fuel and tapering to a lower burn temperature at the end of the burning period. In addition, this type of a center wick structure does not provide for the advantages of a burn surface which has an enlarged burn surface region.

U.S. Pat. No. 4,991,139 discloses a liquid fuel container which has a center wick extending upwardly from the top of the container. This liquid fuel container suffers from the same problems as other center wick burners by providing only a localized heating of the buffet server or chafing dish. Further, this type of a cooking fuel containers does not provide for the essentially constant flame temperature throughout the burning of the contained fuel.

There is accordingly a continuing need in the art for a fuel container that is able to maintain a high temperature for extended periods of time. There is further a need for a cooking container that is able to produce uniform heating at high temperatures while consuming the fuel in a clean and efficient manner. The previous fuel burning containers are not able to produce a high temperature without consuming large quantities of fuel.

SUMMARY OF THE INVENTION

The present invention is directed to a cooking fuel container that is able to provide a higher flame temperature than many of the previous cooking containers. The fuel container is assembled in a sealed condition so that the container can be easily shipped without the fuel leaking. The container can be easily opened by the consumer and ignited without the need for special ignitors.

The invention is further directed to a cooking fuel container that is inexpensive to manufacture and simple to use by the consumer for providing controlled heat output for several hours. The cooking fuel container of the invention comprises a cylindrical fuel container having a closed bottom and a closed side wall to define an open top. The open top is closed by a cover having at least one aperture to define a toroidal shaped burn area for the fuel contained within the container. The toroidal shaped burn area provides a higher burn temperature for a given area of the burn area compared to a circular shaped burn area. The aperture in the cover provides an opening directly to the fuel so that the flame is supported above the aperture and the cover. In this embodiment, the fuel is preferably a gelled alcohol such as methanol, ethanol or propanol.

The toroidal shaped burn area is defined by a circular aperture in the cover. A circular shaped plate-like member is positioned concentrically within the aperture in the cover to form the toroidal opening. The circular plate-like member is supported by at least two, and preferably four, legs extending radially inward from the edge of the aperture in the cover. The legs define a plurality of essentially arcuate shaped openings which make up the toroidal shaped burn area.

In a second embodiment, the top end of the fuel container is closed by a wick support which is dimensioned to complement the inside of the wall of the container. At least one and preferably two apertures are provided in the wick support to communicate with the interior of the fuel container. A fiber wick is supported on the wick support to substantially fill the support. In one embodiment, the wick includes two leg portions that extend downwardly through the apertures in the wick support to contact the fuel. The cover having the toroidal shaped aperture is then positioned over the wick so that the toroidal aperture defines a burn area on the wick. A foil lid is adhesively bonded to the cover to close the aperture and seal the container.

In embodiments, the wick is substantially the dimensions of the wick supporting means which in turn substantially closes the top opening of the container. The wick is of a woven or non-woven textile or a terry cloth, pile or tufted woven fiber structure to provide a burning surface having an increased surface area to provide a better fuel air mixing. An increased burning surface is created by the pile, terry loops or tufts of the fabric which project upwardly from the weft of the fabric. Preferably, the wick is a single ply thickness.

An additional feature which contributes to the burn time and the temperature profile produced in a chafing dish or buffet server is the cross-sectional area of the wick leg segments for feeding fuel to the body of the wick which extend downwardly through the apertures in the wick supporting means and into the fuel. The cross-sectional area of the wick leg segments and the cross-sectional shape and dimension of the apertures is such that the cross-sectional area of the wick leg segment preferably substantially fills the cross-sectional area of the apertures in the wick supporting means. The size of the apertures also controls the rate of fuel flow to the wick and thus the burn time and heat output. The length of each wick leg segment can be varied to tailor the heat output profile. Alternatively, the width of a wick leg segment can vary with length to define a tapered wick leg to tailor the heat output profile.

These and other advantages of the invention will become apparent from the following detailed description, which, taken in conjunction with the annexed drawings, discloses preferred embodiments of the invention.

BRIEF DESCRIPTION OF THE DRAWINGS

Referring to the drawings which form part of this original disclosure.

DETAILED DESCRIPTION OF THE INVENTION

The disadvantages and limitations of the invention are obviated by the present invention while providing an efficient means for heating a cooking vessel. Accordingly, the invention is directed to a cooking fuel container capable of defining a substantially toroidal shaped burn area so as to produce a higher burn temperature compared to the previous fuel containers. The cooking fuel container will produce a constant heating profile with a rapid heating of a chafing dish or other cooking vessel to a temperature of at least about 210° F. The burn time of the fuel container will be at least about three hours and preferably about four hours depending on the amount of fuel in the container.

Figure 1:
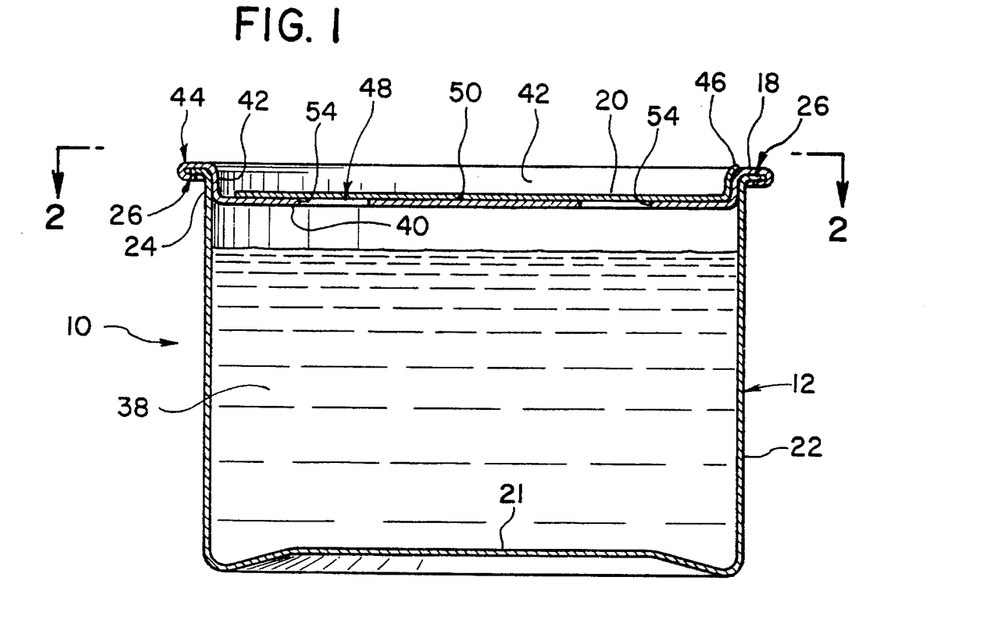
FIG. 1 is an elevated cross-sectional view of the cooking fuel container and burner of the present invention.

Referring to FIG. 1, the cooking fuel container 10 in a preferred embodiment of the invention includes a fuel container 12, cover 18, and a lid 20. The cover 18 is attached to the container 12 by crimping over the edges to close the container.

The container 12 is a substantially cylindrical shaped body having a bottom 21 and a cylindrical side wall 22 defining an open top end 24. The upper edge of the container 12 is turned radially outward to define a flange 26 for attaching to the cover 18. The size and capacity of the container may be varied depending on the desired utility and burn time of the fuel container in a preferred embodiment, the container is dimensioned to have a capacity to support a burn time of at least three and preferably about four hours.

The cover 18 is dimensioned to fit over the open end of the container 12. The cover includes an opening to expose a portion of the interior of the container and define a burn portion for the fuel 38 in the container. In preferred embodiments, the cover 18 is assembled so that the flat portion 40 is parallel to the bottom of the container and horizontal in normal operation. A side wall 42 extends upwardly from the flat portion 40 and terminates at an outwardly extending shoulder 44. The side wall 42 and shoulder 44 are dimensioned to fit within the side wall 22 of the container 12.

The opening in the cover 18 is sealed by the lid 20 made of metal foil which is preferably adhesively attached to the cover. The lid 20 includes a pull tab 46 to assist in removing the lid from the cover.

Figure 2:
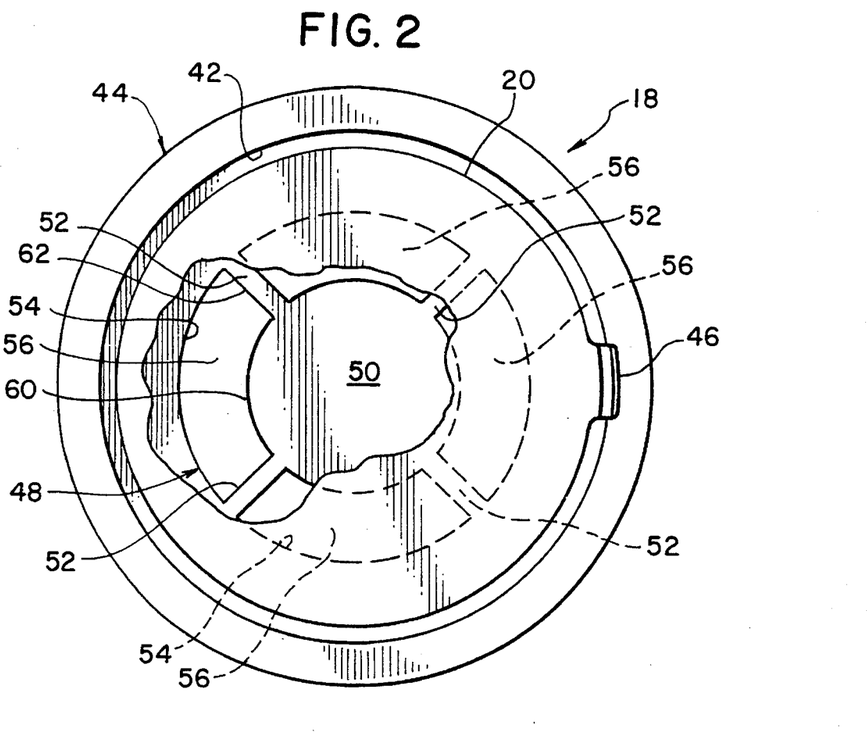
FIG. 2 is a top plan view of the cover of the embodiment of FIG. 1 showing the toroidal burn area in accordance with a first embodiment of the invention.

The opening in the cover 18 exposes the fuel in the container to define a burn area for the fuel and the size of the flame. In a preferred embodiment of FIGS. 1 and 2, the opening in the cover 18 is a substantially circular shaped aperture 48 having a circular planar member 50 concentrically disposed in the aperture. The circular planar member 50 is supported by four legs 52 extending radially inward from the inner edge 54 of the aperture 48. As shown in FIG. 2, the legs 52 are positioned substantially 90° to each other and support the planar member 50 in the same plane as the cover 18. The result is four arcuately shaped apertures 56 to define a discontinuous annular or toroidal shaped burn area above the fuel 38.

The discontinuous toroidal shaped opening in the cover provides a more efficient mixing of air and fuel than a standard single aperture in the cover. The improved air and fuel mixing produces better fuel combustion and a higher burn temperature.

The gelled or liquid fuel generally burns at or above the openings in the cover since no air openings in the cover or container are provided. The arcuate openings are positioned and dimensioned to support combustion of the fuel above the cover without air entering the container through the openings in amounts sufficient to support combustion of the fuel within the container.

In assembling the different parts of the fuel container as shown in FIG. 1, the cover 18 is attached to the container 12 by crimping the shoulder 44 of the cover over the rim 26 of container 12. A sealant is preferably provided between the cover 18 and the rim 26. The lid 20 is then adhesively sealed over the aperture in the cover 18.

In embodiments of the invention as shown in FIG. 1 which do not include a wick positioned below the toroidal shaped opening in the cover, the fuel is a gelled liquid. The preferred fuels include, for example, ethylene glycol, polyethylene glycols, polypropylene glycols, methanol, ethanol, propanol, or other alcohols, alkanes, alkenes, and the like. Since these fuels are normally liquid, it is preferred to include a gelling agent to prevent the fuel from spilling from the container thereby increasing the safety of the fuel container. The use of a gelling agent in an otherwise liquid fuel allows the container and fuel to be classified as a non-flammable solid for purposes of transporting.

Suitable gelled fuels may include about 0.1 to 10 weight percent of a neutralized anionic polymer, 0.1 to 10 weight percent of an auxiliary rheological additive with the balance being the fuel. The neutralized anionic polymer is preferably an amine neutralized cross-linked anionic polymer such as a cross-linked polyacrylic acid polymer having a molecular weight of about 60,000 to 10,000,000.

Examples of suitable gelling agents include the cross-linked polyacrylic acid polymers sold under the tradename Carbopol 941, 976, 940, and 934 by B. F. Goodrich. Other thickening agents include sulfonated polymers having sulfonate functionality, polymers having carboxylic acid functionality, and polymers having maleic anhydride functionality.

The polyacrylic acid polymers may be homopolymers of acrylic acid of methacrylic acid or copolymers of these acids and their salts, esters or amides. The polymers may further contain one or more ethylenically unsaturated monomers, such as styrene, maleic acid, maleic anhydride, 2-hydroxyethylacrylate, acrylonitrile, vinyl acetate, ethylene, or propylene.

The auxiliary rheological additive is preferably a colloidal thickener. A preferred thickener is an amphoteric metal oxide such as aluminum oxide having a particle size of about 0.05 to 2.0 microns. Alternatively, the auxiliary rheological additive may be a fatty acid or a salt thereof.

The discontinuous toroidal shape of the burn area on the wick has been found to produce a flame having a higher temperature than a single circular aperture in the cover for the same wick area. Furthermore, the toroidal shape of the burn area enables the cooking vessel to reach the desired minimum temperature faster than the single circular aperture.

Figure 6:
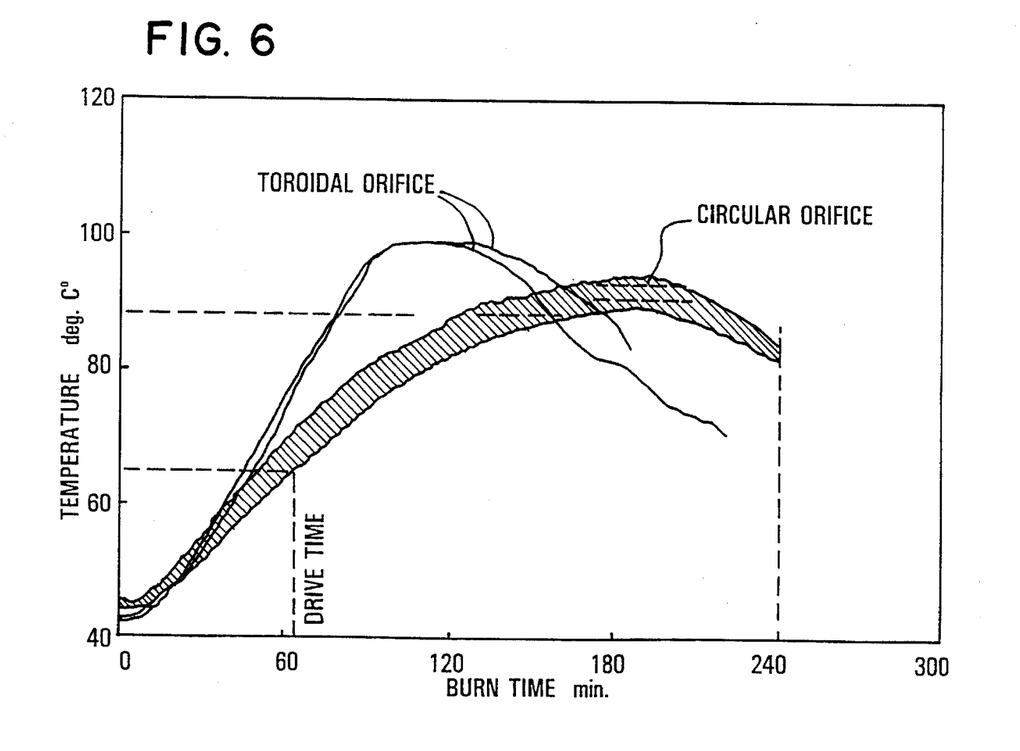
FIG. 6 is a graph showing the temperature of a chafing dish as a function of time of the burn in accordance with the invention.

A study was performed to compare the burn time and temperature of the fuel container having the discontinuous toroidal shaped burn area of FIG. 2 and a conventional fuel container having a single circular aperture to define the burn area. Two fuel containers having equal toroidal shaped burn areas were used in this study. The dimensions, shape and structure of the fuel containers were otherwise identical. Each container contained the same amount of fuel. The exposed burn area for each container was 1.97 sq. in. Each fuel container was tested using a standard chafing dish containing water. The temperature of the water in the chafing dishes as a function of time is displayed in the graph of FIG. 6. As can be seen from the graph of FIG. 6, the container having the toroidal shaped flame reached a higher maximum temperature faster than the circular aperture. The toroidal flame also reached the maximum temperature faster than the standard single circular aperture flame. Table 1 shows the test data of this study.

TABLE 1

| | CHAFER NO. | | |
|---|---|---|---|
| | 1 | 2 | 3 |
| | | CAN | |
| DESCRIPTION | CIRCULAR ORIFICE | TOROIDAL ORIFICE | TOROIDAL ORIFICE |
| ORIFICE$_2$ AREA (in) | 1.97 | 1.97 | 1.97 |
| ORIFICE CIRCUMFERENCE ÷ ORIFICE AREA | 2.53 | 6.36 | 6.36 |
| BURN TIME (min) | 266 | 221 | 186 |
| TIME TO 150° F. (min) | 57.0 | 48.7 | 46.2 |
| MAX TEMP (°F.) & TIME (min) | 198 189 | 210 111 | 210 114 |

The discontinuous toroidal shape of the aperture defines four distinct arcuate shaped burn areas having a burn front exposed to the air to support efficient fuel combustion. Referring to FIG. 2, each arcuate burn area is defined by the outer arcuate edge 54, an inner arcuate edge 60 and opposite ends 62 defined by the legs 52. The arcuate edges 54 and 60 define a burn front exposed to the air. The diameter of the toroidal burn area and the diameter of the inner circular planar member 50 are preferably dimensioned to enable air to enter the center of the cover to feed air to the inner arcuate edges of the apertures. The legs 52 are preferably sufficiently narrow so that when one burn area defined by the arcuate apertures 56 is ignited, the flame is able to propagate to an adjacent arcuate burn area. Thus, the amount of air that is able to enter the burn area and mix with the fuel is increased for a given burn area to support more efficient combustion of the fuel.

The toroidal shape of the apertures 56 produces a co-annular diffusion flame structure in which air diffuses radially inward along the cover 18 to the outer edge 54 defining the aperture 48 and radially outward from the center of the circular planar member 50 to the inner edge 60 of the aperture 48. This radial diffusion of air from both sides of the thin sheet co-annular flame structure results in a more uniform air-fuel ratio throughout the flame thickness than in a conical diffusion flame produced by a circular shaped aperture. For identical aperture areas, the toroidal shape provides enhanced diffusion of air into the flame structure, thereby enhancing the heat release of the cooking fuel burner, reducing the time required to raise the water temperature in the cooking vessel to the preferred minimum temperature of about 160° F.

The dimensions of the apertures 56 may be varied depending on the desired burn temperature and burn time. In preferred embodiments of the invention, the aperture 48 has an outer diameter of about 2.29 inch, the inner planar member has a diameter of about 1.30 inch and the legs 52 have a width of about 0.25 inch. The results of Table 1 demonstrate that a higher burn temperature is obtained by the toroidal burn area in the cover compared to a circular opening having the same cross-sectional area. The cross-sectional area of the toroidal burn area can be reduced to decrease the size of the flame resulting in a lower burn temperature and increased burn time.

Figure 3:
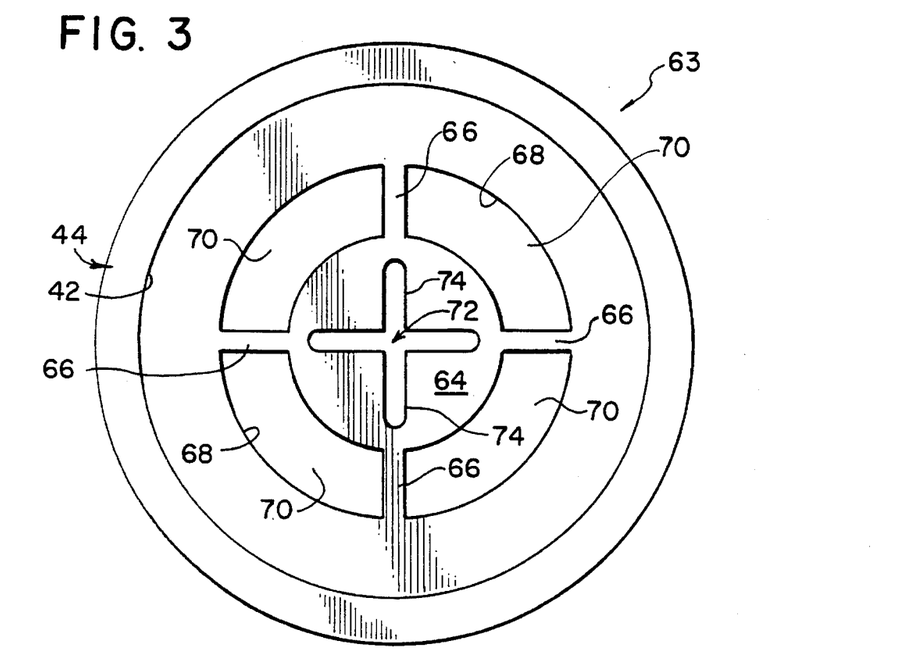
FIG. 3 is a top plan view of the cover member in a second alternative embodiment of the invention.

In an alternative embodiment of the invention shown in FIG. 3, the cover 63 has a discontinuous toroidal shaped aperture defined by a circular planar member 64. Four uniformly spaced legs 66 extend radially inward from inner edge 68 of the aperture to support the planar member 64 and define the four arcuate shaped apertures 70. The planar member 64 also includes a substantially X-shaped aperture 72 in the center to define an additional burn area. The legs 74 of the aperture 72 extend radially toward legs 66 to a point proximate to the arcuate apertures 70. The center aperture 72 provides a means to assist in the propagation of the flame from one arcuate burn area to another. The center aperture 72 further provides a means to define an additional flame front to mix with the air and promote enhanced fuel-air mixture.

Figure 4:
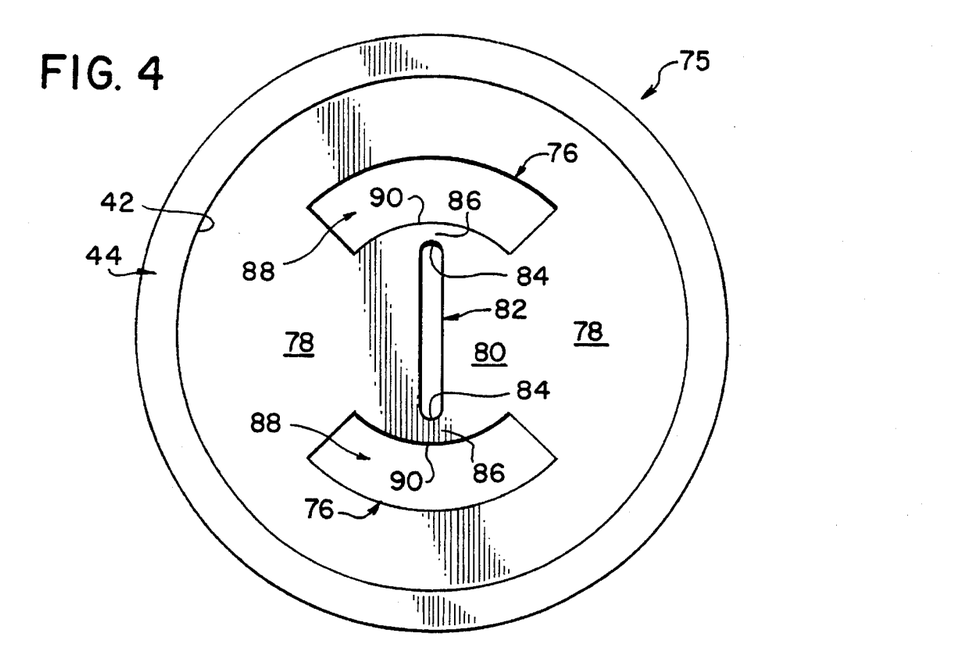
FIG. 4 is a top plan view of the cover member in a third alternative embodiment of the invention.

In another embodiment illustrated in FIG. 4, the cover 75 includes two opposite arcuate shaped apertures 76 separated by a pair of legs 78 and a circular planar member 80. The planar member 80 includes an elongated slot 82 having longitudinal ends 84 terminating a short distance from the arcuate apertures 76. The area 86 between the ends 84 of the slot 82 and the arcuate apertures 76 is sufficiently narrow so that a flame can propagate from one burn area 88 to another. The arcuate apertures 76 define arcuate burn areas 88 and arcuate flames spaced apart by the legs 78.

Figure 5:
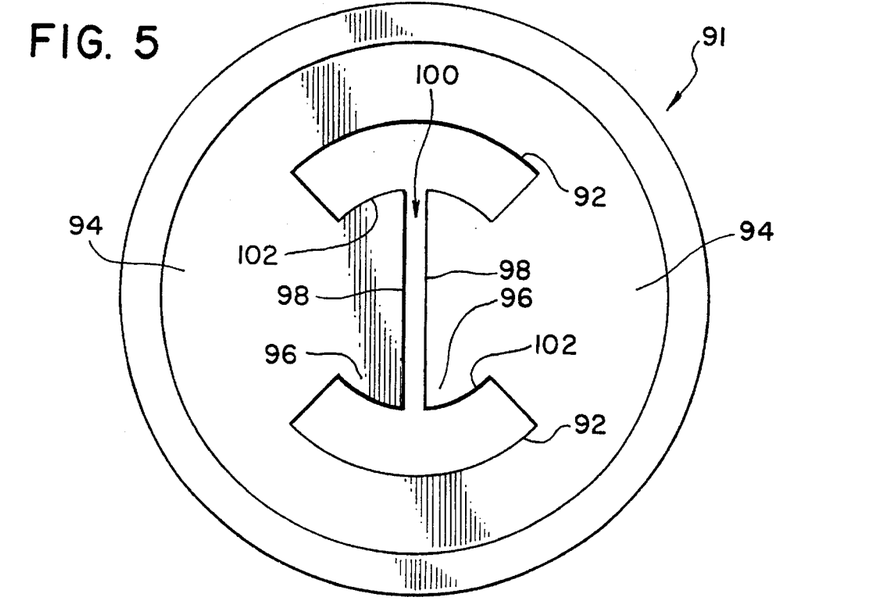
FIG. 5 is a top plan view of the cover member in a fourth alternative embodiment of the invention.

In a further embodiment of FIG. 5, the cover 91 includes two arcuate shaped apertures 92 spaced apart by two leg members 94. A semi-circular portion 96 extends radially inward from each leg 94 such that the straight edges 98 face each other and are spaced apart a slight distance to define a transverse slot 100 to define a transverse burn area. The result is a continuous burn area defined by each of the arcuate apertures 92 and the slot 100. Since the slot 100 extends from one arcuate aperture to the other, it is not necessary for the flame to propagate across the legs 94 as in the embodiments of FIGS. 1–4.

The above embodiments are described in conjunction with a fuel container as illustrated in FIG. 1 where the fuel in the container is a gelled alcohol fuel and the toroidal opening defines the burn area in the cover above the fuel. In alternative embodiments, the cover member is used on a fuel container with a wick so that the cover is positioned on the wick and the apertures in the cover define burn areas on the wick. The wick typically extends into the fuel within the container.

Figure 7:
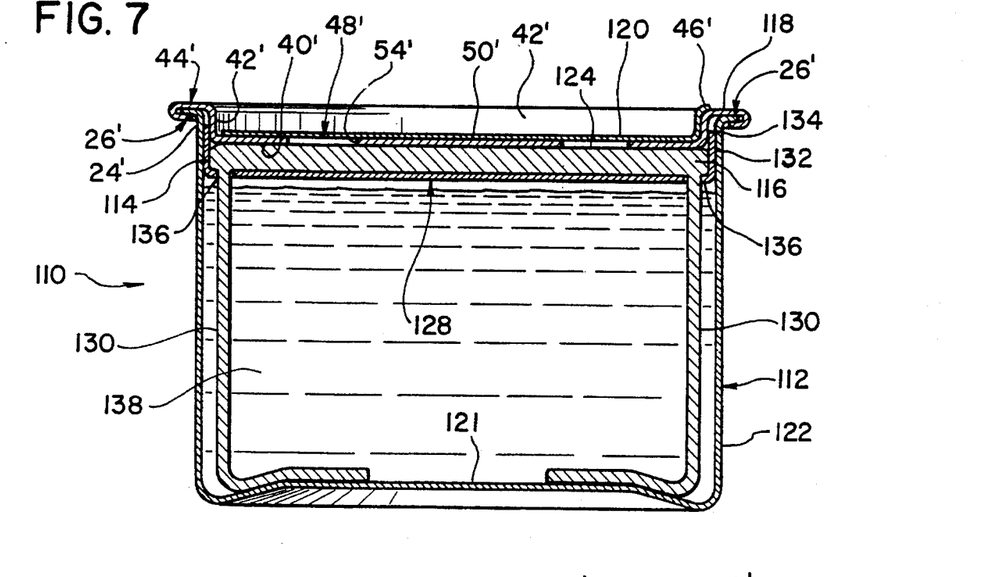
FIG. 7 is a cross-sectional view of a further embodiment of the cooking fuel container where the cover defines a toroidal burn area on a wick.

In a further embodiment illustrated in FIG. 7, the cooking fuel container 110 includes a fuel container 112, a wick support 114, a wick 116, cover 118 and a lid 120. The container 112, the cover 118 and the lid 120 are substantially the same as in the embodiment shown in FIG. 1. Thus, identical elements of the cover 118 are designated by the same reference numbers with the addition of a prime.

The wick supporting member 114 has a tray-like shape including a base portion 128 for supporting a wick 114 and an upstanding side wall 132 terminating at an upper rim 134. The side wall 132 is dimensioned to fit tightly against the side wall 122 of the fuel container 112. The base portion 128 includes one or more and preferably two spaced apart apertures 136. The wick 114 may include optional leg segments 130 which can extend downwardly through the apertures 136 to contact the fuel 138 on the bottom 120 of the container 112. The major portion of the wick 116 is supported by the wick support 114.

The cover 118 overlies the wick 116 and is dimensioned to fit over the open end of the container 112. The cover 118 includes a toroidal shaped opening 48' to expose a toroidal shaped burn area 124 on the surface of the wick 116. In preferred embodiments, the toroidal opening 48' is substantially as shown and described in the embodiment of FIGS. 1 and 2, although the embodiments of FIGS. 3–5 are also suitable. The toroidal burn area 124 on the wick, defined by the cover, functions in the same manner as previously discussed to feed air to the burn fronts and enhance fuel and air mixing and more efficient combustion.

The cover is assembled so that the planar portion 40' contacts the wick 116. The side walls 42' and the shoulder 44' are attached to the side wall 134 of the wick support 114. A suitable sealant is preferably provided between the shoulder 44' and the cover 118 and the rim 26' of the container 112.

The dimensions of various parts of this cooking fuel container and the wick support are important with regard to the igniting and burning characteristics of the container and burner. It is important that the area of the apertures 136 in the wick supporting member be within a particular range. These annular apertures 136 should be of a size where the wick that extends through the aperture fills the aperture. In this way, the wick will serve also to seal the fuel storage part of the container from the burn surface of the wick. In a circular embodiment, these apertures are of a diameter having an area of from about 8 to 40 square millimeters, and preferably about 20 mm$^2$. Further there is a relationship between the cross-sectional area of the apertures 136 and the cross-sectional dimension of the wick segments 130 which pass through apertures 136. It also has been found that the wick segments which substantially fill the cross-sectional area of the apertures 136 provide effective fuel flow to the wick without unduly restricting fuel flow. The wick segments 130 preferably have a length sufficient to contact and rest on the bottom surface 120 of container 112 as illustrated in FIG. 7.

In preferred embodiments of the invention, two circular apertures 136 are provided along opposite edges of the base portion 128. In alternative embodiments, the apertures 136 can be rectangular or half-moon shaped. The apertures 136 are positioned adjacent the side walls 132 so that the apertures are not positioned directly below the opening in the cover 120. The size of the apertures 136 are generally about 50–125% of the cross-sectional dimension of the feed segments 130 when dry. When the wick is placed in the fuel, the feed segments 130 swell slightly to completely fill the aperture. In alternative preferred embodiments, the aperture is dimensioned about 75–100% of the dry cross-sectional dimension and most preferably about 90–100% of the dry cross-sectional dimension of the feed segments 130. The actual size of the apertures will depend in part on the wick material, the type of fuel and the desired burning rate and flame height. The amount of fuel being fed to the burning surface 124 of the wick can be varied by adjusting the size and shape of the apertures 136 and the size of the feed segments 130. Reducing the size of the apertures in relation to the size of the feed segments of the wick restricts the flow of fuel to the burn surface of the wick thereby increasing burn time of the fuel container. It is generally preferred to have the size and shape of the feed segment of the wick complement the dimension of the aperture to substantially fill the aperture. In this manner, the fuel is able to easily wick up to the burn area of the wick without restriction. The wick segments further fill the apertures sufficiently to prevent leakage of the fuel through the aperture.

The wick 116 may be a woven or non-woven material having a pile of suitable height and density to provide an elevated burning surface and to effectively wick the fuel to the burning surface. A closed loop, terry-type pile fabric material is generally preferred since the pile provides a large surface area exposed to the air to support combustion of the fuel. The pile further provides an efficient means to wick the fuel from the body of the wick to the combustion surface which is the surface formed by the ends of the pile. A pile burn surface on the wick provides a large fuel surface area for ease of ignition without the need for ignition compositions. It also provides a surface for good air/fuel mixing and thus a more efficient combustion of the fuel. The fuel wicks up the pile or loops with the result being an enhanced burning due to better air/fuel mixing.

The pile of the wick generally extends away from the weft and warp yarns of the fabric which results in the burn front being slightly elevated from the wick and the ends of the pile which contributes to the air mixing efficiently with the fuel. The fuel wicks up each pile to essentially define a plurality of burn fronts or burn areas. Each pile provides a micro-wick structure for evaporation of the fuel and for anchoring a flamelet. Also, the pile provides for ease of ignition and flame spreading across the wick surface. It has been found that with fuels having a high flash point such as ethylene glycol that a pile or tufted wick produces a better fuel-air mixture resulting in a higher burn temperature compared to conventional non-pile wick materials.

In preferred embodiments, the wick is a terry-type cloth fabric comprising a plurality of ground warp yarns, ground fill yarns, and pile warp yarns to define terry pile loops as known in the art. Generally, the terry loops extend from both faces of the fabric to maximize the wicking capacity of the fabric. A suitable terry-type fabric has a weight of about 30 to 90 meters per kilogram. The fabric generally has about 10:1 filling yarn, about a 10:1 ground yarn, about 3.55:1 pile yarn, a terry ratio of about 7, 28 ends per centimeter and about 17 picks per centimeter.

The wick may be a terry-type cloth, a closed loop pile or a cut pile fabric. The terry loops, closed loops or cut pile have a length sufficient to form a surface area and wicking capability to support combustion of the fuel. The length of the terry loops, closed loops or pile is sufficient to produce efficient fuel/air mixing to elevate the burn front a slight distance above the wick and the pile. The length of the pile or loops is generally at least about 1 mm up to about 10 mm. The wick material will preferably have a thickness of about 4–15 mm and preferably about 5–10 mm. The density of the pile or loops will also effect the thickness of the wick material. It will be recognized that the pile may tend to lay flat on the wick material and thus the length of the pile may not accurately reflect the thickness of the wick material. Generally, it is preferred to have a wick material which extends away from the material to promote air/fuel mixing.

The feed segments 130 of the wick may be integrally formed with the wick 116 or may be separate members attached to the wick such as by stitching. The feed segments are preferably formed of the same wick material as the wick. In alternative embodiments, the feed segments may be a conventional woven wick material. The dimension of the feed segments are preferably substantially the dimensions of the apertures in the wick support member and typically have a width ranging from about 4–12 mm.

In preferred embodiments, the wick material is 100% cotton terry-type cloth. Synthetic blends may also be used provided the synthetic materials do not dissolve in the fuel or burn out before the end of the useful life of the cooking container.

Figure 8:
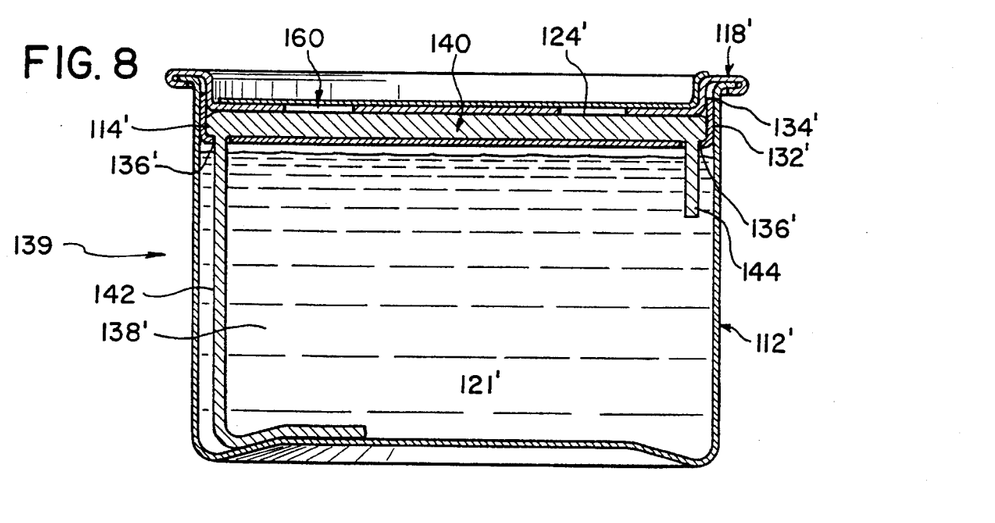
FIG. 8 is a cross-sectional view of a further embodiment of the cooking fuel container showing two wick leg segments having different lengths.

In a further embodiment illustrated in FIG. 8, the fuel container 139 is substantially the same as in the embodiment of FIG. 7 with the exception that a wick 140 is provided having a long feed segment 142 extending to the bottom 120' of the container and a short feed segment 144. The cover, container and wick support are substantially the same as in the embodiment of FIG. 7 and are designated by the same reference numbers with the addition of a prime. The cover 118' includes the toroidal shaped opening 160 as in the embodiment of FIGS. 1, 2 and 7 to define a toroidal burn area 124' on the wick 140. In this embodiment, the short wick feed segment 144 initially contacts the fuel as shown in FIG. 8 so that both feed segments 142,144 supply fuel to the wick 140 during initial start up of the fuel container. The initial fuel supply to the wick 140 by both feed segments enables a high initial temperature to be obtained for rapidly bringing a cooking vessel to a desired temperature. As the fuel is consumed and the fuel level in the container falls, the short feed segment 144 will no longer contact the fuel and stop supplying fuel to the burn area of the wick 140. At this time, the long feed segment 142 will continue to feed fuel to the wick. The result is fuel being fed to the burn area of the wick at a slower rate than when both feed segments contact the fuel. The slower feed rate of the fuel will provide a lower heat output and a prolonged burn time. The result is a fuel container having an initial high heat output for quickly bringing a cooking container to a desired temperature followed by a lower heat output for maintaining a desired temperature for a prolonged period of time. The length of time of the initial high heat output is determined by the length of the short feed segment 144 and the initial fuel level in the container.

Figure 9:
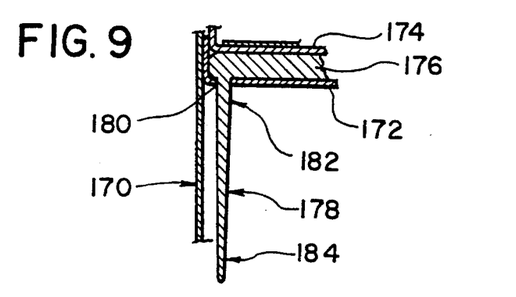
FIG. 9 is a cross-sectional view of a further embodiment of the invention showing a tapered feed segment for supplying fuel to the wick.

In a further embodiment shown in FIG. 9, the fuel container 170 includes a wick support 172, a cover 174 having a toroidal opening defining a burn area, and feed segments 178 extending through apertures 180 in the wick support 172. The feed segments 178 are tapered toward their lower end. In this embodiment, the feed segments are wider at the upper end 182 than the lower end 184 to supply fuel at a high rate during the initial burn period thereby providing a rapid heating of the cooking vessel. As the fuel in the container is consumed and the level drops, the cross-sectional area of the feed segment 178 contacting the fuel is reduced thereby slowing the feed rate to the burn area of the wick 176. The reduced feed rate lowers the heat output of the fuel container and prolongs the burn time. The shape of the feed segments can be tailored to obtain a desired burn profile.

The net result of this cooking fuel container and burner having a toroidal opening is a unit which is able to produce a constant temperature flame throughout a burn time of greater than about four hours for a standard size container. A standard size container is one which will contain from about 250 grams to 325 grams and preferably about 285 grams of cooking fuel. The cooking fuel is preferably an organic liquid which is classified as non-flammable for purposes of safety classification and handling. The cooking container of the invention is particularly suitable for non-flammable fuels such as the glycols, and in particular, ethylene glycol, triethylene glycol and propylene glycol. These fuels have a high flash point, high vaporization temperature and are stable at high temperatures. General embodiments including a wick positioned below the cover, the fuels have a viscosity sufficiently low to enable the fuel to wick up the wick segments from the container to the burn area.

Various modifications can be made to the present cooking fuel container and burner to produce essentially the same results. Such cooking fuel containers and burners would function in essentially the same manner and would be equivalent in structure. All such cooking fuel containers and burners would be considered to be within the presently claimed invention.

What is claimed is:

1. A cooking fuel container comprising:

a fuel container for a fuel, said container including a bottom wall, a closed side wall having an upper edge and an open top;

a cover sealingly attached to the upper edge of said sidewall and closing a portion of the top of said container, said cover having a circular planar member disposed in a substantially horizontal plane with respect to a normal operating position of said container, said circular planar members surrounded by a plurality of arcuate shaped apertures, each arcuate aperture defining a burn area, said arcuate apertures being arranged to form a toroidal shaped burn front for said fuel disposed in said container, spacing means for arcuately spacing said apertures apart, and within an area circumscribed by said arcuate apertures at least one aperture which extends to adjacent at least two of said arcuate apertures.

2. The fuel container of claim 1, wherein said spacing means has a width between said apertures whereby a flame can propagate from one burn area of a first aperture to a second burn area of a second aperture.

3. The fuel container of claim 1, wherein said central planar portion comprises a circular member and said spacing means comprises a plurality of legs extending radially on said cover to support said circular member, said circular member and said legs being positioned in the same plane as said planar portion of said cover.

4. The fuel container of claim 1 further comprising a removable lid adhesively attached to said cover.

5. A cooking fuel container comprising:

a fuel container for containing a combustible fuel, said fuel container having a bottom and a closed side wall having an upper edge defining an open top;

a cover sealingly attached to the upper edge of said sidewall and closing a portion of the top of said fuel container, said cover having at least one radially disposed aperture having an outer edge, a circular member having a peripheral edge and being co-axially disposed with said outer edge to form said aperture, at least two legs extending radially inward on said cover to said peripheral edge of said circular member to define at least two substantially arcuate burn areas adjacent said circular member, and said circular member having at least one aperture which extends to adjacent at least two of said arcuate apertures.

6. The container of claim 5, wherein said circular member defines a substantially toroidal shaped burn area and said legs have a width so that a flame can propagate from one burn area to an adjacent burn area.

7. The container of claim 5, wherein said circular member is defined by two opposing semi-circular shaped members being spaced apart a distance to define an elongated burn front therebetween.

8. A cooking fuel container comprising:

a fuel container for a fuel, said container including a bottom wall, a closed side wall and an open top;

a cover closing a portion of the top of said container, said cover having a circular planar member disposed in a substantially horizontal plane with respect to a normal operating position of said container, said circular, planar member surrounded by a plurality of arcuate shaped apertures, each arcuate aperture defining a burn area, said arcuate apertures being arranged to form a toroidal shaped burn front for said fuel disposed in said container, spacing means for arcuately spacing said arcuate apertures apart, and said central planar portion including an elongated aperture having opposite ends proximate opposing arcuate apertures whereby a flame can propagate from said arcuate aperture to said elongated aperture.

9. The fuel container of claim 8 wherein said spacing means comprises two opposing spacing means wherein each of said spacing means comprises a leg having a first end coupled to said circular planar member and extending radially outward from said circular planar member and a second end coupled to a portion of said cover adjacent a periphery thereof, said opposing spacing means defining an elongated aperture therebetween and extending between said arcuate apertures.

10. The fuel container as in claim 9 wherein there are at least two arcuate shaped apertures and at least one elongated aperture.

11. The fuel container as in claim 9 wherein there are about four arcuate apertures and about two longitudinal apertures.

12. The fuel container as in claim 8 wherein there are at least two elongated apertures.

13. The fuel container as in claim 12 wherein said elongated apertures intersect.

* * * * *